United States Patent
Kinoshita et al.

(10) Patent No.: US 10,934,989 B2
(45) Date of Patent: Mar. 2, 2021

(54) VEHICLE CONTROL APPARATUS

(71) Applicant: SUBARU CORPORATION, Tokyo (JP)

(72) Inventors: Takahiro Kinoshita, Tokyo (JP); Hirofumi Shimizu, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/518,237

(22) Filed: Jul. 22, 2019

(65) Prior Publication Data
US 2020/0102928 A1    Apr. 2, 2020

(30) Foreign Application Priority Data

Sep. 28, 2018  (JP) ............................ JP2018-184945

(51) Int. Cl.
| | |
|---|---|
| *F02P 5/04* | (2006.01) |
| *F02D 41/04* | (2006.01) |
| *F02D 41/12* | (2006.01) |
| *F02D 41/10* | (2006.01) |
| *F02D 41/00* | (2006.01) |

(Continued)

(52) U.S. Cl.
CPC .............. *F02P 5/045* (2013.01); *F02D 29/06* (2013.01); *F02D 41/0005* (2013.01); *F02D 41/107* (2013.01); *F02D 41/123* (2013.01); *F02P 5/15* (2013.01); *F02D 2200/602* (2013.01)

(58) Field of Classification Search
CPC ....... F02P 5/045; F02P 5/1504; F02D 41/123; F02D 41/107; F02D 2250/21; F02D 41/045
See application file for complete search history.

(56) References Cited

U.S. PATENT DOCUMENTS

| | | | | |
|---|---|---|---|---|
| 4,596,217 | A | * | 6/1986 | Bonitz .................. F02P 5/1521 123/406.36 |
| 2018/0297599 | A1 | * | 10/2018 | Kinoshita ................ B60K 6/48 |

FOREIGN PATENT DOCUMENTS

| | | |
|---|---|---|
| JP | 07-310571 A | 11/1995 |
| JP | 09-135502 A | 5/1997 |

(Continued)

OTHER PUBLICATIONS

Japanese Notification of Reasons for Refusal issued in corresponding Japanese Patent Application No. 2018-184945, dated Nov. 19, 2019, with English translation.

*Primary Examiner* — Sherry L Estremsky
(74) *Attorney, Agent, or Firm* — McDermott Will & Emery LLP

(57) ABSTRACT

A vehicle control apparatus includes input-side and output-side rotating elements, a fuel injection controller, and an ignition timing controller. The ignition timing controller controls ignition timing of an engine to first timing on the condition that the engine is controlled from a fuel cut state to a fuel injection state, and afterwards, changes the ignition timing to second timing on advance side of the first timing. The ignition timing controller changes the ignition timing toward the second timing at a first change rate until a rotational acceleration rate of the output-side rotating element reaches a threshold. After the rotational acceleration rate of the output-side rotating element reaches the threshold, the ignition timing controller changes the ignition timing toward the second timing at a second change rate greater than the first change rate.

15 Claims, 11 Drawing Sheets

(51) Int. Cl.
*F02D 29/06* (2006.01)
*F02P 5/15* (2006.01)

(56) References Cited

FOREIGN PATENT DOCUMENTS

| | | |
|---|---|---|
| JP | 09-203367 A | 8/1997 |
| JP | 2012-057600 A | 3/2012 |
| JP | 2013-142307 A | 7/2013 |
| JP | 2015-222033 A | 12/2015 |

\* cited by examiner

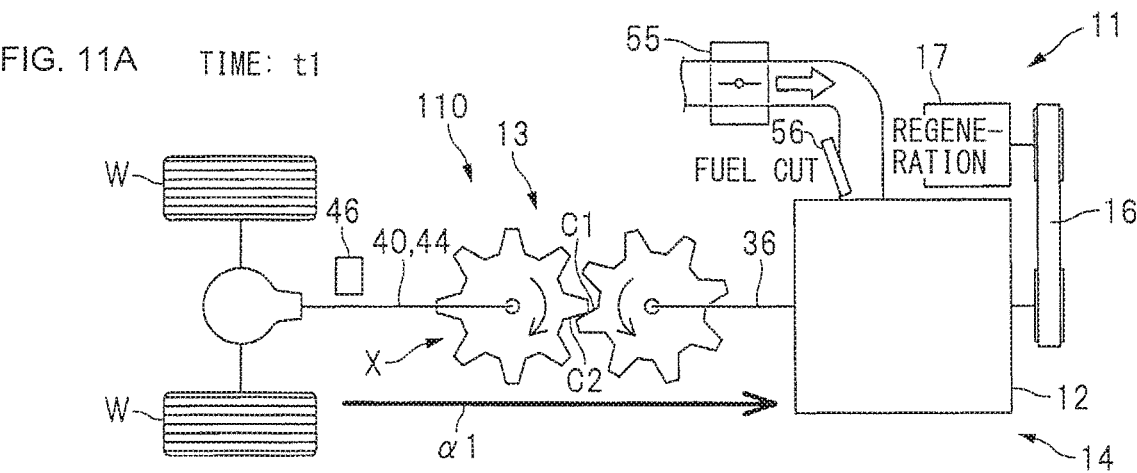
FIG. 11A  TIME: t1
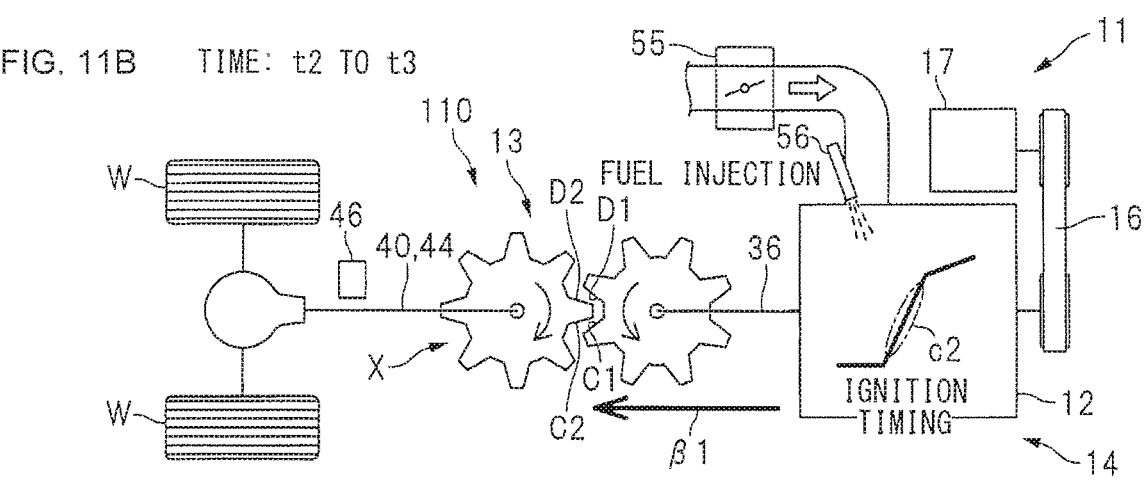
FIG. 11B  TIME: t2 TO t3
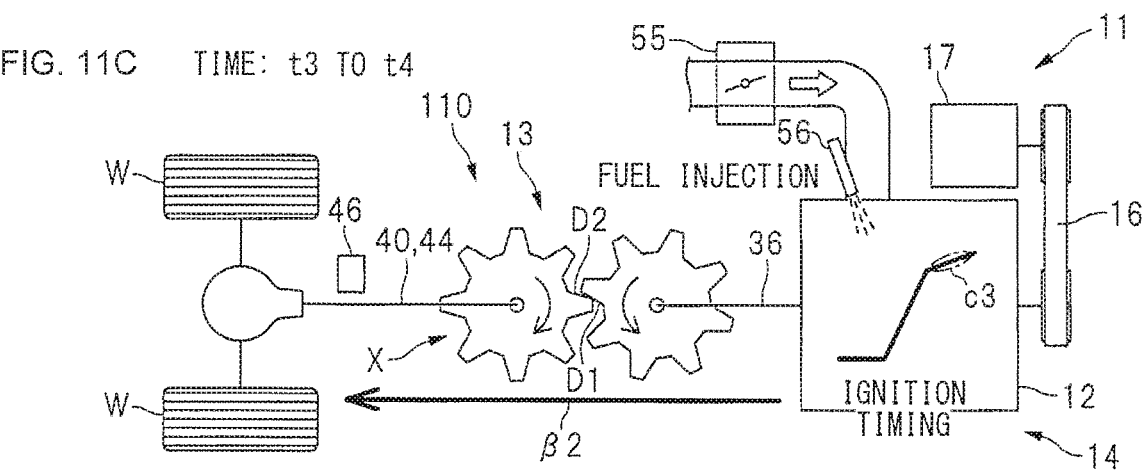
FIG. 11C  TIME: t3 TO t4

VEHICLE CONTROL APPARATUS

CROSS-REFERENCE TO RELATED APPLICATIONS

This application claims priority from Japanese Patent Application No. 2018-184945 filed on Sep. 28, 2018, the entire contents of which are hereby incorporated by reference.

BACKGROUND

The technology relates to a vehicle control apparatus to be mounted on a vehicle.

In an engine to be mounted on a vehicle such as an automobile, ignition timing is controlled in accordance with, for example, an amount of intake air and an engine speed. Further, it is desirable to control the ignition timing of the engine by a so-called minimum advance for best torque (MBT), but when a sign of knocking is detected from the engine, it is common to execute an ignition retardation control. The ignition retardation control includes delaying the ignition timing in order to avoid knocking. For example, reference can be made to Japanese Unexamined Patent Application Publication No. 2015-222033.

SUMMARY

An aspect of the technology provides a vehicle control apparatus to be mounted on a vehicle. The vehicle includes an engine, a shifting mechanism, one or more wheels, a first power transmission path between the engine and the shifting mechanism, and a second power transmission path between the shifting mechanism and the one or more wheels. The vehicle control apparatus includes an input-side rotating element, an output-side rotating element, a fuel injection controller, and an ignition timing controller. The input-side rotating element is provided on the first power transmission path. The output-side rotating element is provided on the second power transmission path. The fuel injection controller is configured to control the engine from a fuel cut state to a fuel injection state on the condition that an accelerator pedal operation is made on decelerated travel of the vehicle. The ignition timing controller is configured to control ignition timing of the engine to first timing on the condition that the engine is controlled from the fuel cut state to the fuel injection state, and afterwards, change the ignition timing to second timing on advance side of the first timing. The ignition timing controller changes the ignition timing toward the second timing at a first change rate until a rotational acceleration rate of the output-side rotating element reaches a threshold. The ignition timing controller changes the ignition timing toward the second timing at a second change rate greater than the first change rate, after the rotational acceleration rate of the output-side rotating element reaches the threshold.

An aspect of the technology provides a vehicle control apparatus to be mounted on a vehicle. The vehicle includes an engine, a shifting mechanism, one or more wheels, a first power transmission path between the engine and the shifting mechanism, and a second power transmission path between the shifting mechanism and the one or more wheels. The vehicle control apparatus includes an input-side rotating element, an output-side rotating element, and circuitry. The input-side rotating element is provided on the first power transmission path. The output-side rotating element is provided on the second power transmission path. The circuitry is configured to control the engine from a fuel cut state to a fuel injection state on the condition that an accelerator pedal operation is made on decelerated travel of the vehicle. The circuitry is configured to control ignition timing of the engine to first timing on the condition that the engine is controlled from the fuel cut state to the fuel injection state, and afterwards, change the ignition timing to second timing on advance side of the first timing. The circuitry changes the ignition timing toward the second timing at a first change rate until a rotational acceleration rate of the output-side rotating element reaches a threshold. The circuitry changes the ignition timing toward the second timing at a second change rate greater than the first change rate, after the rotational acceleration rate of the output-side rotating element reaches the threshold.

BRIEF DESCRIPTION OF THE DRAWINGS

The accompanying drawings are included to provide a further understanding of the disclosure, and are incorporated in and constitute a part of this specification. The drawings illustrate implementations and, together with the specification, serve to explain the principles of the disclosure.

FIGS. 11A to 11C are schematic diagrams of examples of operation states of the power train in the retardation cancelation control.

DETAILED DESCRIPTION

Figure 1:
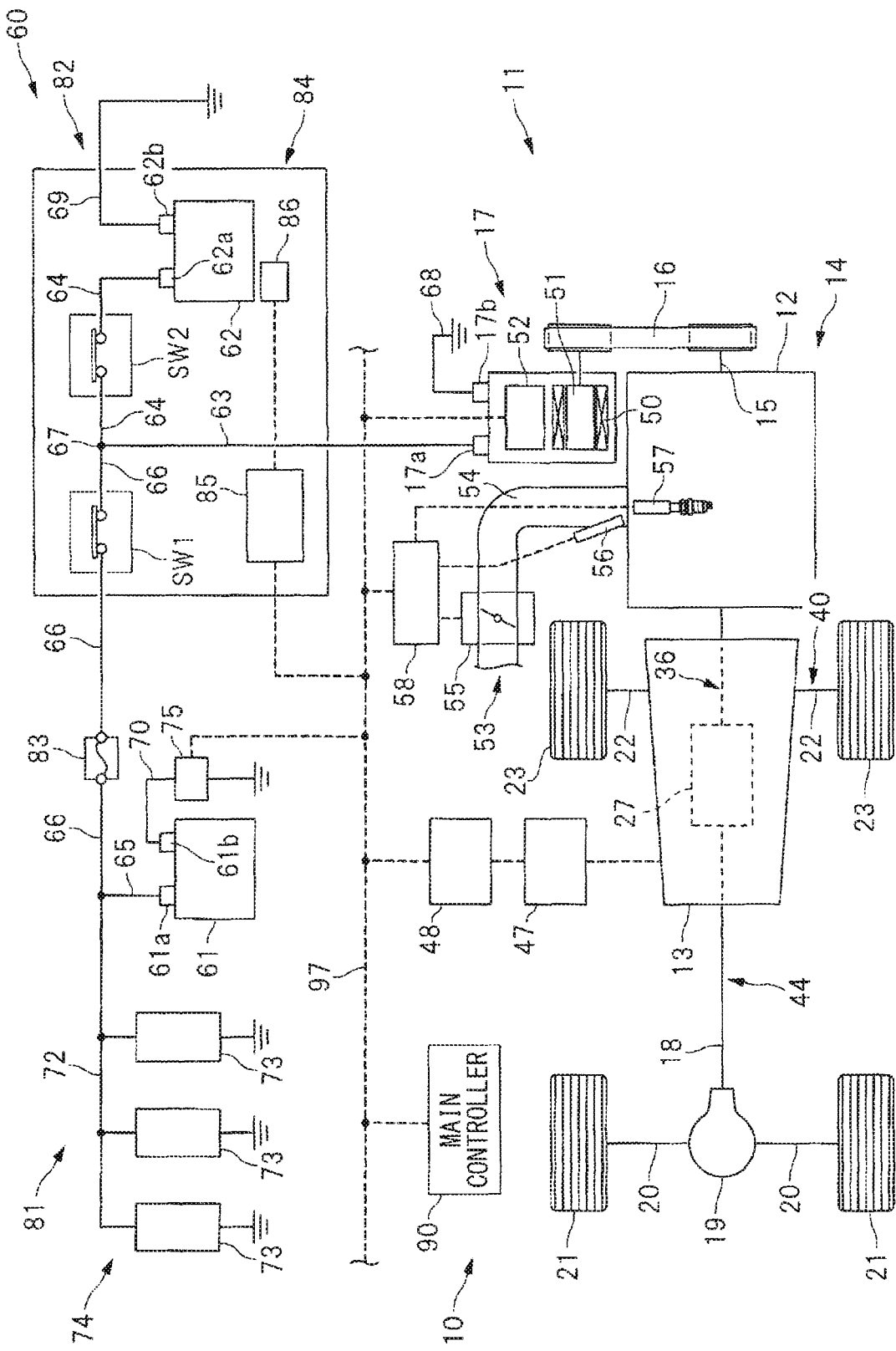
FIG. 1 is a schematic diagram of a configuration example of a vehicle on which a vehicle control apparatus according to one implementation of the technology is mounted.

In the following, some preferred but non-limiting implementations of the technology are described in detail with reference to the accompanying drawings. Note that sizes, materials, specific values, and any other factors illustrated in respective implementations are illustrative for easier understanding of the technology, and are not intended to limit the scope of the technology unless otherwise specifically stated. Further, elements in the following example implementations which are not recited in a most-generic independent claim of the technology are optional and may be provided on an as-needed basis. Throughout the specification and the drawings, elements having substantially the same function and configuration are denoted with the same reference numerals to avoid any redundant description. Further, elements that are not directly related to the technology are unillustrated in the drawings. The drawings are schematic and are not intended to be drawn to scale.

An ignition retardation control causes lowered engine torque. This leads to consideration of executing the ignition retardation control at a restart of fuel injection, from the viewpoint of suppressing torque fluctuation at the restart of the fuel injection. In addition, the ignition retardation control may constitute a possible cause of lowered thermal efficiency. It is, therefore, important to quickly advance the ignition timing and return to a normal control, after executing the ignition retardation control at the restart of the fuel injection. However, rapidly changing the ignition timing of the engine may cause engine torque fluctuation, resulting in possibility of occurrence of a shock. What is desired is, therefore, to quickly change the ignition timing while suppressing the occurrence of the shock.

It is desirable to provide a vehicle control apparatus that makes it possible to quickly change ignition timing while suppressing occurrence of a shock.

[Vehicle Configuration]

FIG. 1 schematically illustrates a configuration example of a vehicle 11 on which a vehicle control apparatus 10 according to one implementation of the technology is mounted. Referring to FIG. 1, on the vehicle 11, a power train 14 may be mounted. The power train 14 may include an engine 12 and a transmission 13. The engine 12 may include a crank shaft 15 to which a starter generator 17 is coupled through a belt mechanism 16. The transmission 13 may be coupled to the engine 12. To the transmission 13, coupled may be rear wheels 21 and front wheels 23. The rear wheels 21 may be coupled to the transmission 13 through a propeller shaft 18, a rear differential mechanism 19, and a rear wheel drive shaft 20. The front wheels 23 may be coupled to the transmission 13 through a front wheel drive shaft 22.

In one implementation of the technology, the starter generator 17 may serve as a "generator". In one implementation of the technology, the rear wheels 21 and the front wheels 23 may serve as "one or more wheels".

Figure 2:
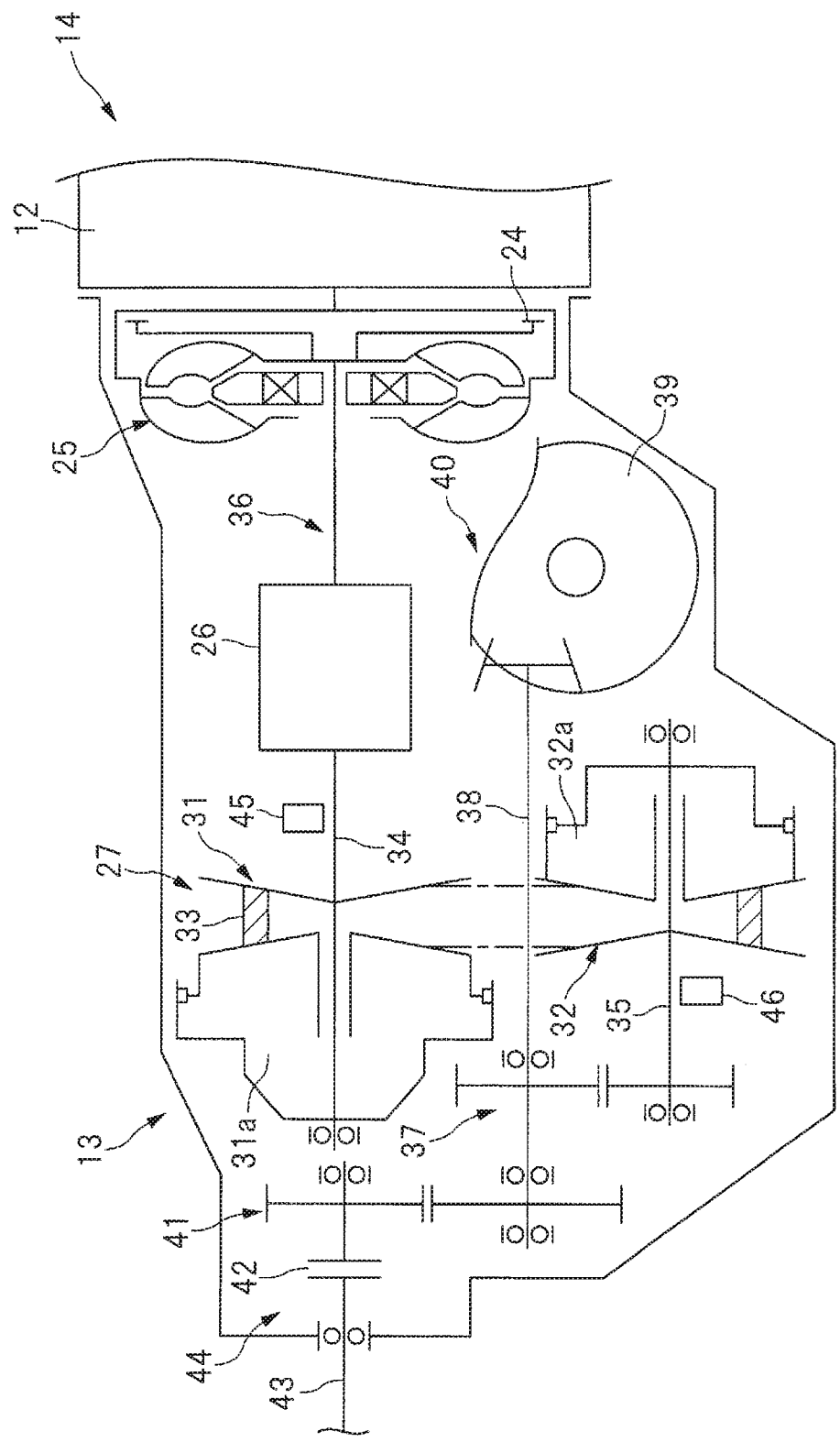
FIG. 2 is a diagram of an example of an internal structure of a transmission.

FIG. 2 illustrates an example of an internal structure of the transmission 13. Referring to FIG. 2, the transmission 13 may include a torque converter 25 including a lock up clutch 24. The transmission 13 may further include a forward and reverse switching mechanism 26 and a continuous shifting mechanism 27. The continuous shifting mechanism 27 may include a primary pulley 31 and a secondary pulley 32. A hydraulic chamber 31a may be defined in the primary pulley 31, and a hydraulic chamber 32a may be defined in the secondary pulley 32. This makes it possible to change a pulley groove width by a hydraulic control. A drive chain 33 may be routed around the primary pulley 31 and the secondary pulley 32. The drive chain 33 may transfer motive power. Further, a primary shaft 34 may be coupled to the primary pulley 31, and a secondary shaft 35 may be coupled to the secondary pulley 32.

In one implementation of the technology, the continuous shifting mechanism 27 may serve as a "shifting mechanism".

To the primary pulley 31, coupled may be the engine 12 through the primary shaft 34, the forward and reverse switching mechanism 26, and the torque converter 25. In other words, between the engine 12 and the continuous shifting mechanism 27, provided may be an input-side power transmission path 36. The input-side power transmission path 36 may include, for example but not limited to, the primary shaft 34, the forward and reverse switching mechanism 26, and the torque converter 25.

In one implementation of the technology, the input-side power transmission path 36 may serve as a "first power transmission path". In one implementation of the technology, the primary shaft 34, the forward and reverse switching mechanism 26, and the torque converter 25, without limitation, may each serve as an "input-side rotating element" provided on the "first power transmission path".

To the secondary pulley 32, coupled may be a front wheel output shaft 38 through the secondary shaft 35 and a gear train 37. Furthermore, to the front wheel output shaft 38, coupled may be the front wheels 23 through a front differential mechanism 39 and the front wheel drive shaft 22 as mentioned above. In other words, between the continuous shifting mechanism 27 and the front wheels 23, provided may be an output-side power transmission path 40. The output-side power transmission path 40 may include, for example but not limited to, the secondary shaft 35, the gear train 37, the front wheel output shaft 38, the front differential mechanism 39, and the front wheel drive shaft 22.

In one implementation of the technology, the output-side power transmission path 40 may serve as a "second power transmission path". In one implementation of the technology, the secondary shaft 35, the gear train 37, the front wheel output shaft 38, the front differential mechanism 39, and the front wheel drive shaft 22, without limitation, may each serve as an "output-side rotating element" provided on the "second power transmission path".

To the front wheel output shaft 38, coupled may be a rear wheel output shaft 43 through a gear train 41 and a transfer clutch 42. Furthermore, to the rear wheel output shaft 43, coupled may be the rear wheels 21 through the propeller shaft 18, the rear differential mechanism 19, and the rear wheel drive shaft 20 as mentioned above. In other words, between the continuous shifting mechanism 27 and the rear wheels 21, provided may be an output-side power transmission path 44. The output-side power transmission path 44 may include, for example but not limited to, the secondary shaft 35, the gear train 37, the front wheel output shaft 38, the gear train 41, the transfer clutch 42, the rear wheel output shaft 43, the propeller shaft 18, the rear differential mechanism 19, and the rear wheel drive shaft 20.

In one implementation of the technology, the output-side power transmission path 44 may serve as a "second power transmission path". In one implementation of the technology, the secondary shaft 35, the gear train 37, the front wheel output shaft 38, the gear train 41, the transfer clutch 42, the rear wheel output shaft 43, the propeller shaft 18, the rear differential mechanism 19, and the rear wheel drive shaft 20, without limitation, may each serve as an "output-side rotating element" provided on the "second power transmission path".

The transmission 13 may further include a primary rotation sensor 45 and a secondary rotation sensor 46. The primary rotation sensor 45 may detect a rotation speed of the primary shaft 34. The secondary rotation sensor 46 may detect a rotation speed of the secondary shaft 35. Moreover, as illustrated in FIG. 1, a valve unit 47 may be coupled to the transmission 13, in order to make the hydraulic control of, for example, the continuous shifting mechanism 27 and the torque converter 25 provided in the transmission 13. The valve unit 47 may include, for example but not limited to, a solenoid valve and a hydraulic path. Furthermore, a transmission controller 48 may be coupled to the valve unit 47. The transmission controller 48 may include, for example but not limited to, a microcomputer. Allowing the transmission controller 48 to control an operation state of the valve unit 47 makes it possible to control, for example but not limited to, a shifting ratio of the continuous shifting mechanism 27 and an operation state of the torque converter 25.

The starter generator 17 coupled to the engine 12 may be a so-called integrated starter generator (ISG) that serves as a generator and an electric motor. Not only may the starter generator 17 serve as the generator driven by the crank shaft 15, the starter generator 17 may also serve as the electric motor that drives the crank shaft 15. For example, the starter generator 17 may be controlled to a powering state, in a case of a restart of the engine 12, in an idling stop control, or in a case of assistance with the engine 12 at the time of, for example, a start and acceleration. Thus, the starter generator 17 may serve as the electric motor.

The starter generator 17 may include a stator 50 and a rotor 51. The stator 50 may include a stator coil. The rotor 51 may include a field coil. The starter generator 17 may further include an ISG controller 52, in order to control energized states of the stator coil and the field coil. The ISG controller 52 may include an inverter, a regulator, a microcomputer, various sensors, and other parts. Allowing the ISG controller 52 to control the energized states of the field coil and the stator coil makes it possible to control, for example but not limited to, a power generation voltage, power generation torque, and powering torque of the starter generator 17.

The engine 12 may include an intake system 53. The intake system 53 may include an intake manifold 54. In the intake manifold 54, provided may be a throttle valve 55 that adjusts an amount of intake air. Opening the throttle valve 55 makes it possible to increase the amount of the intake air of the engine 12. Closing the throttle valve 55 makes it possible to reduce the amount of the intake air of the engine 12. Moreover, the engine 12 may further include an injector 56 that injects fuel into an intake port and a cylinder. Allowing the injector 56 to inject fuel causes the engine 12 to be controlled to a fuel injection state. Stopping the fuel injection from the injector 56 causes the engine 12 to be controlled to a fuel cut state. Furthermore, the engine 12 may further include an ignition device 57. The ignition device 57 may include, for example but not limited to, an ignitor and an ignition plug. Allowing the ignition device 57 to control ignition timing of the engine 12 makes it possible to control, for example but not limited to, torque of the engine 12 and a combustion temperature of the engine 12. It is to be noted that an engine controller 58 may be coupled to the throttle valve 55, the injector 56, and the ignition device 57.

[Power Circuit]

Figure 3:
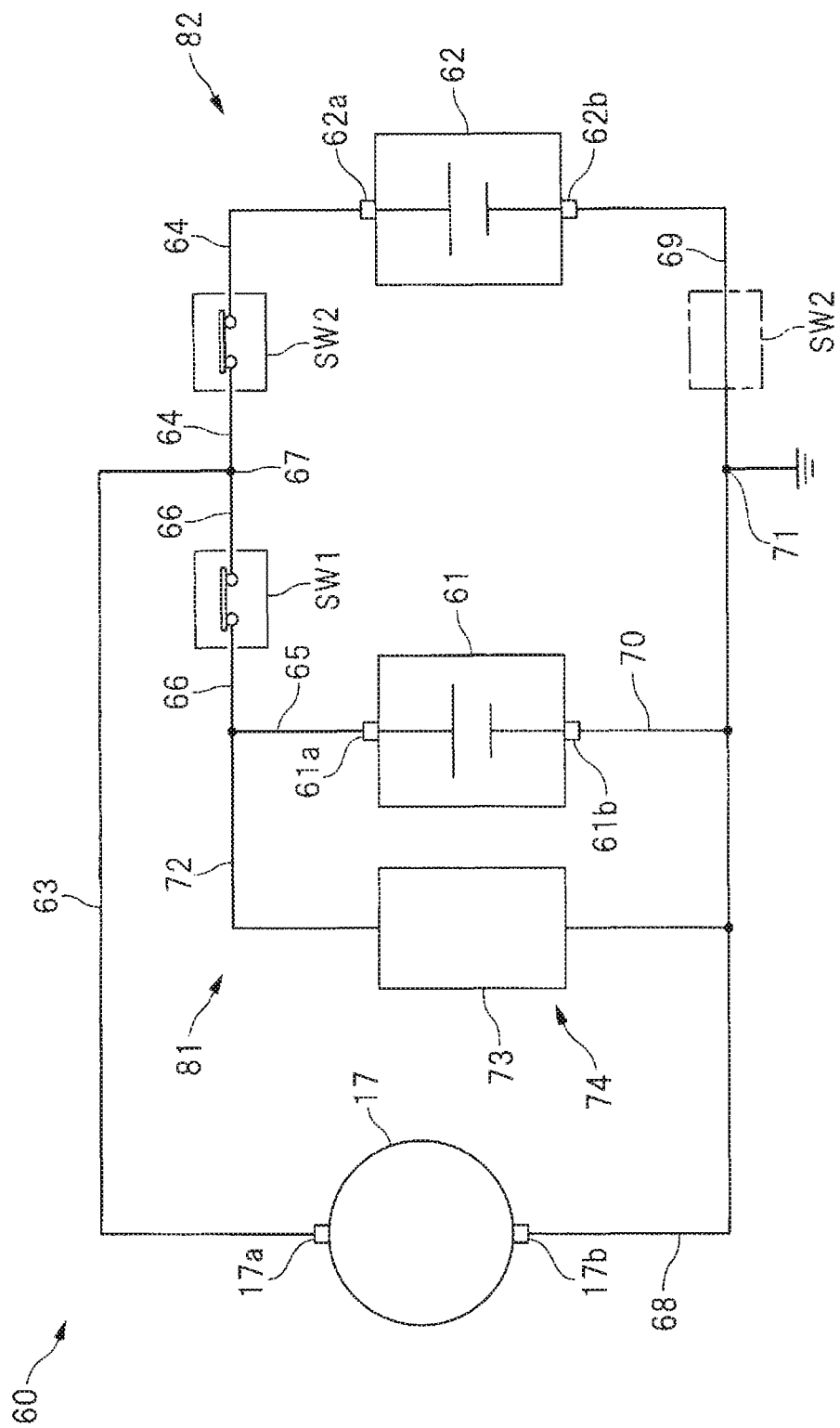
FIG. 3 is a circuit diagram of a simplified example of a power circuit.

Described is a power circuit 60 to be mounted on the vehicle 11. FIG. 3 is a circuit diagram of a simplified example of the power circuit 60. Referring to FIG. 3 the power circuit 60 may include a lead battery 61 and a lithium ion battery 62. The lead battery 61 may be electrically coupled to the starter generator 17. The lithium ion battery 62 may be electrically coupled, in parallel with the lead battery 61, to the starter generator 17. It is to be noted that a terminal voltage of the lithium ion battery 62 may be higher in design than a terminal voltage of the lead battery 61, in order to positively cause discharge of the lithium ion battery 62. Moreover, internal resistance of the lithium ion battery 62 may be lower in design than internal resistance of the lead battery 61, in order to positively cause charge and the discharge of the lithium ion battery 62.

A positive electrode line 63 may be coupled to a positive electrode terminal 17a of the starter generator 17. A positive electrode line 64 may be coupled to a positive electrode terminal 62a of the lithium ion battery 62. A positive electrode line 66 may be coupled to a positive electrode terminal 61a of the lead battery 61 through a positive electrode line 65. The positive electrode lines 63, 64, and 66 may be coupled to one another through a connection point 67. Moreover, a negative electrode line 68 may be coupled to a negative electrode terminal 17b of the starter generator 17. A negative electrode line 69 may be coupled to a negative electrode terminal 62b of the lithium ion battery 62. A negative electrode line 70 may be coupled to a negative electrode terminal 61b of the lead battery 61. The negative electrode lines 68, 69, and 70 may be coupled to one another through a reference potential point 71.

As illustrated in FIG. 1, to the positive electrode line 65 of the lead battery 61, coupled may be a positive electrode line 72. To the positive electrode line 72, coupled may be a group of electric devices 74 including electric devices 73 such as various actuators and various controllers. Moreover, on the negative electrode line 70 of the lead battery 61, provided may be a battery sensor 75. The battery sensor 75 may have a function of detecting a charge current, a discharge current, and the terminal voltage of the lead battery 61. The battery sensor 75 may further have a function of detecting a state of charge SOC of the lead battery 61 from, for example, the charge current and the discharge current. It is to be noted that the battery sensor 75 may be also coupled to the positive electrode terminal 61a of the lead battery 61 through an undepicted electrical conduction line.

The power circuit 60 may include a first power supply system 81 and a second power supply system 82. The first power supply system 81 may include the lead battery 61 and the electric devices 73. The second power supply system 82 may include the lithium ion battery 62 and the starter generator 17. The lead battery 61 and the lithium ion battery 62 may be coupled in parallel to each other through the positive electrode line 66 provided between the first power supply system 81 and the second power supply system 82. On the positive electrode line 66, provided may be an electric power fuse 83 and a switch SW1. The electric power fuse 83 is configured to be melted down by an excessive current. The switch SW1 is configured to be controlled to an ON state and an OFF state. Moreover, on the positive electrode line 64 of the lithium ion battery 62, provided may be a switch SW2. The switch SW2 is configured to be controlled to an ON state and an OFF state.

Controlling the switch SW1 to the ON state makes it possible to couple the first power supply system 81 and the second power supply system 82 to each other. Controlling the switch SW1 to the OFF state makes it possible to isolate the first power supply system 81 and the second power supply system 82 from each other. Controlling the switch SW2 to the ON state makes it possible to couple the starter generator 17 and the lithium ion battery 62 to each other. Controlling the switch SW2 to the OFF state makes it possible to isolate the starter generator 17 and the lithium ion battery 62 from each other.

The switches SW1 and SW2 may each be a switch including a semiconductor element such as a metal oxide semiconductor field effect transistor (MOSFET), or alternatively the switches SW1 and SW2 may each be a switch that causes a contact to mechanically open or close with the use of, for example but not limited to, electromagnetic force. The ON state of the switches SW1 and SW2 refers to an energized state that forms electrical coupling, or a conductive state. The OFF state of the switches SW1 and SW2 refers to a non-energized state that forms electrical isolation, or a cutoff state. It is to be noted that the switches SW1 and SW2 may be also referred to as, for example, a relay or a contactor.

As illustrated in FIG. 1, the power circuit 60 may include a battery module 84. The battery module 84 may include not only the lithium ion battery 62 but also the switches SW1 and SW2. The battery module 84 may further include a battery controller 85. The battery controller 85 may include, for example but not limited to, a microcomputer and various sensors. The battery module 84 may further include a battery sensor 86. The battery sensor 86 may detect, for example but not limited to, a charge current, a discharge current, the terminal voltage, and a temperature of the lithium ion battery 62. The battery controller 85 may also have a function of calculating a state of charge SOC of the lithium ion battery 62 on the basis of, for example, the charge current and the discharge current to be transmitted from the battery sensor 86. Furthermore, the battery controller 85 may have a function of controlling the switches SW1 and SW2 on the basis of, for example, the SOC of the lithium ion battery 62.

It is to be noted that the state of charge SOC of the lithium ion battery 62 or the lead battery 61 refers to a ratio that indicates an amount of remaining electrical energy of the lithium ion battery 62 or the lead battery 61, or a ratio of an amount of accumulated electrical energy to a full charged capacity of the lithium ion battery 62 or the lead battery 61. For example, in a case where the lithium ion battery 62 or the lead battery 61 is charged to an upper limit capacity, the state of charge SOC may be calculated as 100%. For example, in a case where the lithium ion battery 62 or the lead battery 61 discharges to a lower limit capacity, the state of charge SOC may be calculated as 0%.

[Control System]

Figure 4:
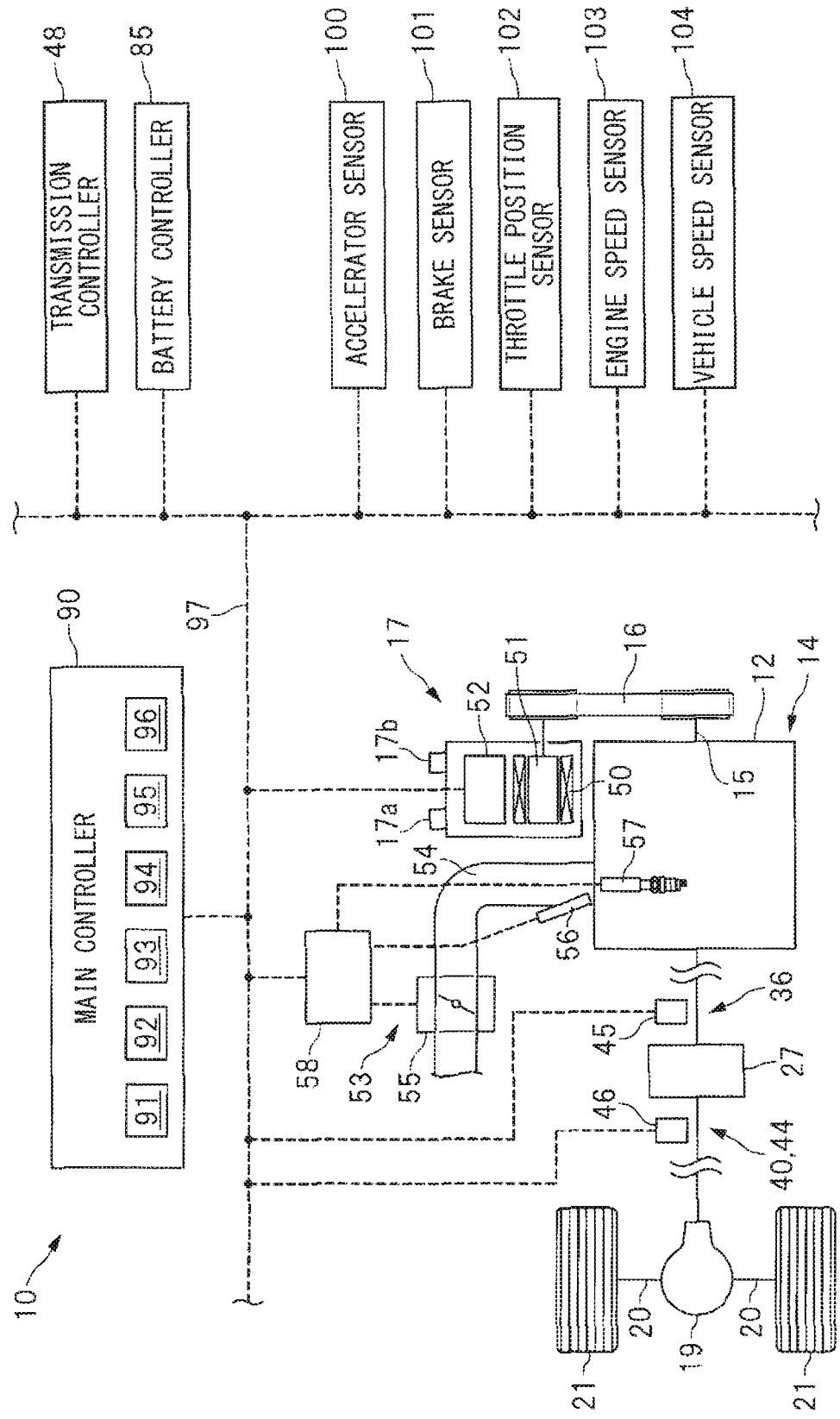
FIG. 4 is a schematic diagram of an example of a control system provided in the vehicle control apparatus.

FIG. 4 is a schematic diagram of an example of a control system provided in the vehicle control apparatus 10. As illustrated in FIGS. 1 and 4, the vehicle control apparatus 10 may include a main controller 90. The main controller 90 is provided for a cooperative control of, for example but not limited to, the power train 14 and the power circuit 60. The main controller 90 may include, for example but not limited to, a microcomputer. The main controller 90 may include a fuel injection control unit 91, an ignition timing control unit 92, and a throttle valve control unit 93, in order to control an operation state of the engine 12. The fuel injection control unit 91 may control the injector 56. The ignition timing control unit 92 may control the ignition device 57. The throttle valve control unit 93 may control the throttle valve 55. The main controller 90 may further include a shifting control unit 94 that controls the valve unit 47 of the transmission 13. Furthermore, the main controller 90 may also include an ISG control unit 95 and a switch control unit 96. The ISG control unit 95 may control the starter generator 17. The switch control unit 96 may control the switches SW1 and SW2.

In one implementation of the technology, the ISG control unit 95 may serve as a "power generation controller".

The main controller 90, the transmission controller 48, the ISG controller 52, the engine controller 58, and the battery controller 85 may be communicatively coupled to one another through an on-vehicle network 97 such as a controller area network (CAN) and a local interconnect network (LIN). Moreover, various sensors may be coupled to the main controller 90 through the on-vehicle network 97. Non-limiting examples of the sensors to be coupled to the main controller 90 may include the primary rotation sensor 45 and the secondary rotation sensor 46 described above. Non-limiting examples of the sensors to be coupled to the main controller 90 may further include an accelerator sensor 100, a brake sensor 101, a throttle position sensor 102, an engine speed sensor 103, and a vehicle speed sensor 104. The accelerator sensor 100 may detect an operation state of an accelerator pedal. The brake sensor 101 may detect an operation state of a brake pedal. The throttle position sensor 102 may detect a throttle plate position of the throttle valve 55. The engine speed sensor 103 may detect an engine speed. The vehicle speed sensor 104 may detect a travel speed of the vehicle 11.

The main controller 90 may control, for example but not limited to, the power train 14 and the power circuit 60 on the basis of data or information from the controllers and the sensors. It is to be noted that the main controller 90 may control the starter generator 17 through the ISG controller 52, and control the switches SW1 and SW2 through the battery controller 85. The main controller 90 may control the injector 56, the ignition device 57, and the throttle valve 55 through the engine controller 58.

[Power Generation Control of Starter Generator]

Description is given next of a power generation control of the starter generator 17. The ISG control unit 95 of the main controller 90 may supply a control signal to the ISG controller 52, to control the starter generator 17 to a power generation state. The power generation state of the starter generator 17 may include a combustion power generation state and a regenerative power generation state described later. For example, in a case where the state of charge SOC of the lithium ion battery 62 lowers, the ISG control unit 95 may raise the power generation voltage of the starter generator 17, to control the starter generator 17 to the combustion power generation state. In a case where the state of charge SOC of the lithium ion battery 62 increases, the ISG control unit 95 may lower the power generation voltage of the starter generator 17, to control the starter generator 17 to a power generation suspended state.

Figure 5:
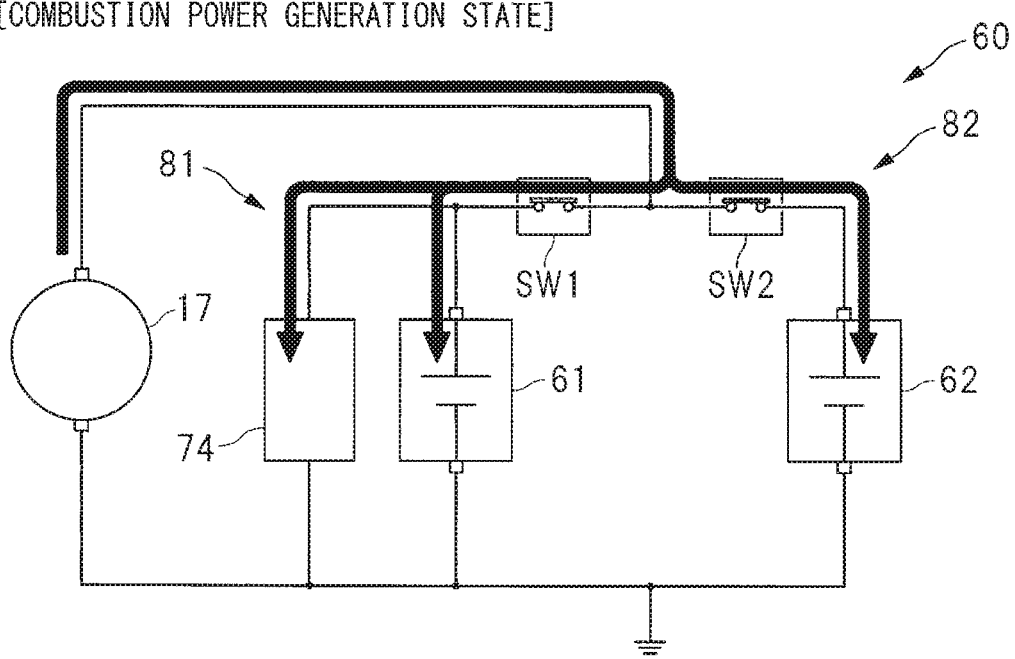
FIG. 5 is a diagram of an example of a situation as to how currents are supplied, with a starter generator controlled to a combustion power generation state.

FIG. 5 illustrates an example of a situation as to how currents are supplied, with the starter generator 17 controlled to the combustion power generation state. The combustion power generation state of the starter generator 17 means allowing, by engine power, the starter generator 17 to generate power, i.e., causing fuel combustion inside the engine 12 to allow the starter generator 17 to generate power. In one specific but non-limiting example, in a case where the state of charge SOC of the lithium ion battery 62 is lower than a predetermined value, the starter generator 17 may be allowed, by the engine power, to generate power, in order to charge the lithium ion battery 62. Thus, in controlling the starter generator 17 to the combustion power generation state, the power generation voltage of the starter generator 17 may be raised to a greater value than the terminal voltages of the lead battery 61 and the lithium ion battery 62. In this way, as denoted by black arrows in FIG. 5, currents may be supplied from the starter generator 17 to, for example, the lithium ion battery 62, the group of the electric devices 74, and the lead battery 61, causing the lithium ion battery 62 and the lead battery 61 to be charged slowly.

Figure 6:
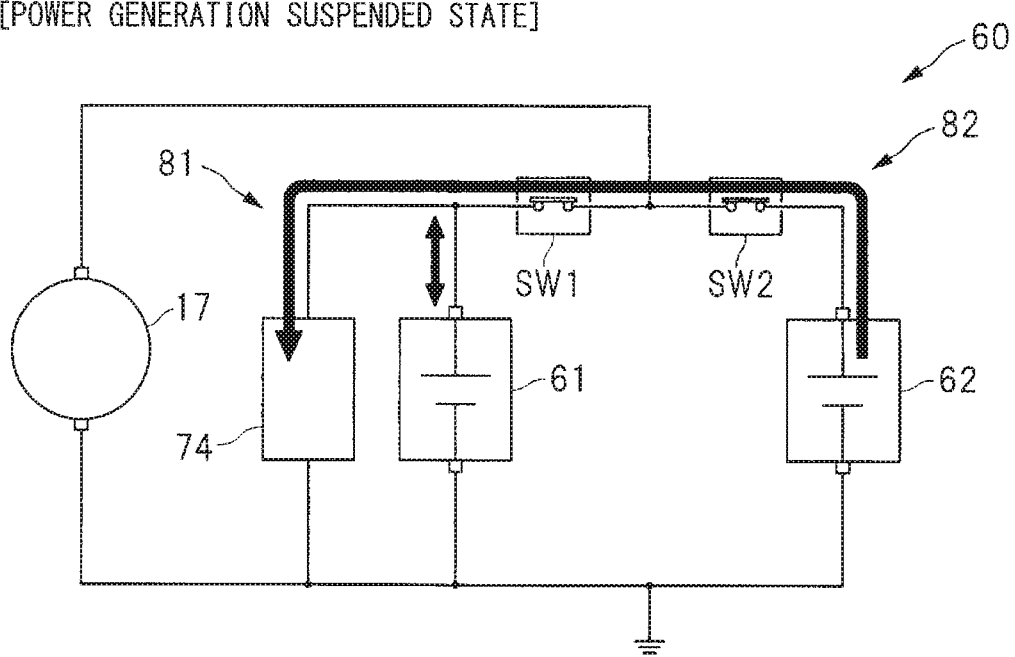
FIG. 6 is a diagram of an example of a situation as to how currents are supplied, with the starter generator controlled to a power generation suspended state.

FIG. 6 illustrates an example of a situation as to how currents are supplied, with the starter generator 17 controlled to the power generation suspended state. In one specific but non-limiting example, in a case where the state of charge SOC of the lithium ion battery 62 is higher than a predetermined value, power generation by the starter generator 17 with the use of the engine power may be stopped, in order to positively cause the discharge of the lithium ion battery 62. Thus, in controlling the starter generator 17 to the power generation suspended state, the power generation voltage of the starter generator 17 may be lowered to a smaller value than the terminal voltages of the lead battery 61 and the lithium ion battery 62. In this way, as denoted by black arrows in FIG. 6, a current may be supplied from the lithium ion battery 62 to the group of the electric devices 74. This makes it possible to stop the power generation by the starter generator 17, leading to reduction in an engine load. It is to be noted that it suffices for the power generation voltage of the starter generator 17 in the power generation suspended state to be a power generation voltage that allows the lithium ion battery 62 to discharge. For example, the power generation voltage of the starter generator 17 may be controlled to 0 (zero) V, or alternatively, the power generation voltage of the starter generator 17 may be controlled to a greater value than 0 (zero) V.

As mentioned above, the ISG control unit 95 of the main controller 90 may control the starter generator 17 to the combustion power generation state or the power generation suspended state on the basis of the state of charge SOC. Meanwhile, at the time of vehicle deceleration, it is desirable to recover much kinetic energy to enhance fuel consumption performance. Therefore, at the time of the vehicle deceleration, the power generation voltage of the starter generator 17 may be raised, to control the starter generator 17 to the regenerative power generation state. This makes it possible to increase power-generated electric power of the starter generator 17. It is therefore possible to positively convert the kinetic energy to electric energy and to recover the electric energy, leading to higher energy efficiency of the vehicle 11 and enhancement in the fuel consumption performance. A determination as to whether or not to execute regenerative power generation as described above may be made on the basis of, for example but not limited to, the operation states of the accelerator pedal and the brake pedal. For example, on decelerated travel with a release of stepping down of the accelerator pedal, or on decelerated travel with stepping down of the brake pedal, the starter generator 17 may be controlled to the regenerative power generation state.

Figure 7:
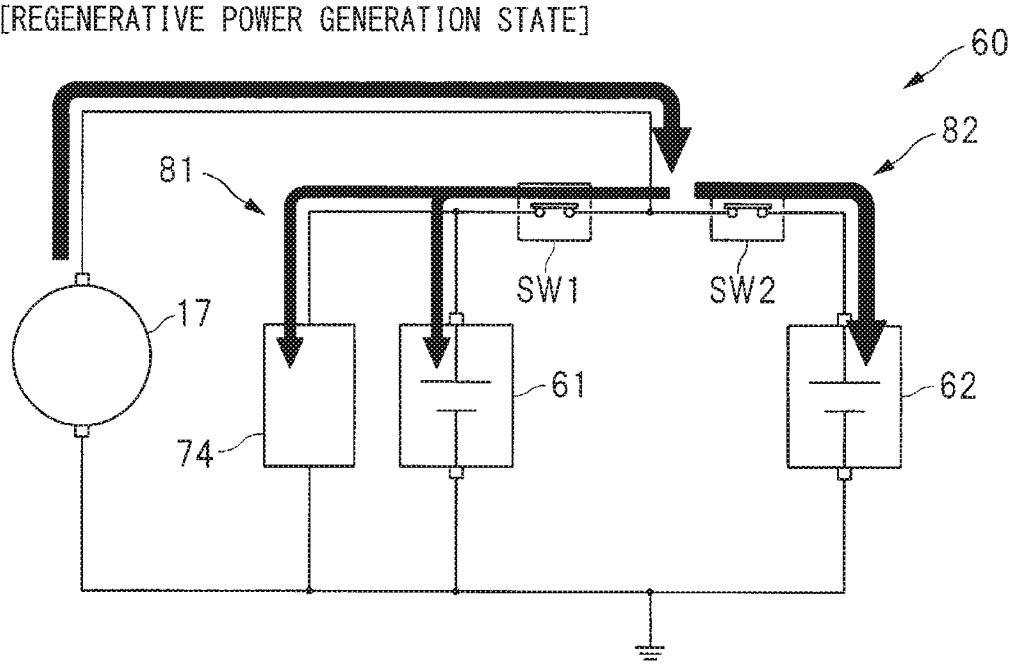
FIG. 7 is a diagram of an example of a situation as to how currents are supplied, with the starter generator controlled to a regenerative power generation state.

FIG. 7 illustrates an example of a situation as to how currents are supplied, with the starter generator 17 controlled to the regenerative power generation state. In controlling the starter generator 17 to the regenerative power generation state, the power generation voltage of the starter generator 17 may be raised to a higher value than in the combustion power generation state as mentioned above. This causes large current supply from the starter generator 17 to the lithium ion battery 62 and the lead battery 61, as denoted by black arrows in FIG. 7, resulting in rapid charge of the lithium ion battery 62 and the lead battery 61. Moreover, because the internal resistance of the lithium ion battery 62 is smaller than the internal resistance of the lead battery 61, most of the power-generated current is supplied to the lithium ion battery 62.

It is to be noted that as illustrated in FIGS. 5 to 7, in controlling the starter generator 17 to the combustion power generation state, the regenerative power generation state, and the power generation suspended state, the switches SW1 and SW2 may be kept in the ON state. In other words, in the vehicle control apparatus 10, it is possible to control the charge and the discharge of the lithium ion battery 62 solely by controlling the power generation voltage of the starter generator 17 without making a switching control of the switches SW1 and SW2. Hence, it is possible to easily control the charge and the discharge of the lithium ion battery 62, and to enhance durability of the switches SW1 and SW2.

[Powering Control of Starter Generator]

Figure 8:
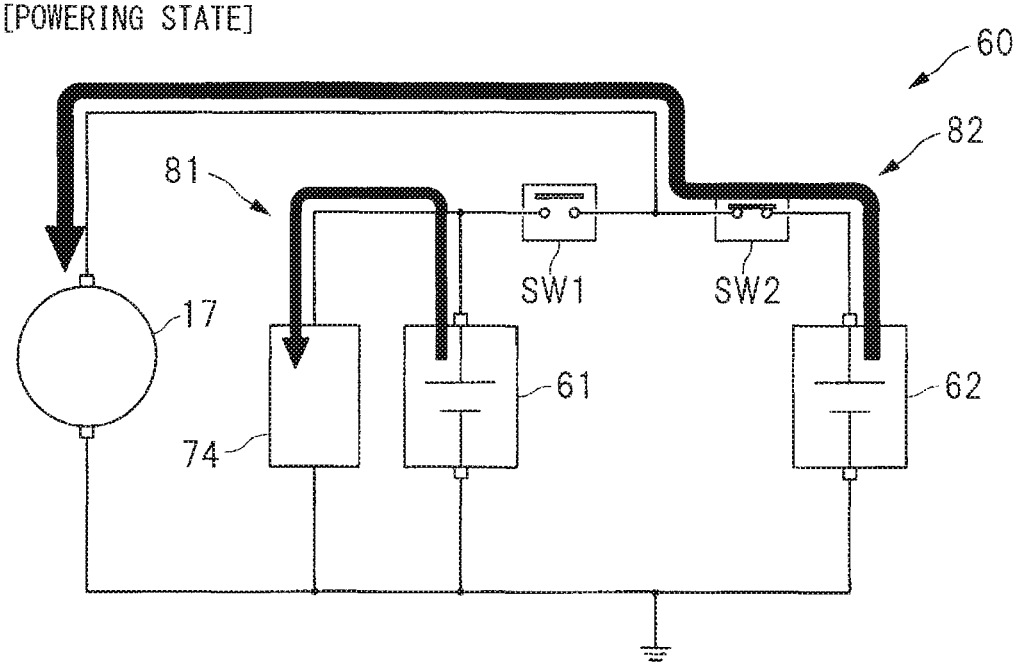
FIG. 8 is a diagram of an example of a situation as to how currents are supplied, with the starter generator controlled to a powering state.

Described next is a powering control of the starter generator 17. The ISG control unit 95 of the main controller 90 may control the starter generator 17 to the powering state, in the case of, for example, the restart of the engine 12 in the idling stop control. FIG. 8 illustrates an example of a situation as to how currents are supplied, with the starter generator 17 controlled to the powering state. As illustrated in FIG. 8, in controlling the starter generator 17 to the powering state at the restart of the engine 12 in the idling stop control, the switch SW1 may be switched from the ON state to the OFF state. This makes it possible to prevent an instantaneous voltage drop with respect to the group of the electric devices 74 even in a case with large current supply from the lithium ion battery 62 to the starter generator 17. It is therefore possible to allow the group of the electric devices 74, without limitation, to function normally.

It is to be noted that in the example illustrated in FIG. 8, in controlling the starter generator 17 to the powering state, the switch SW1 is switched to the OFF state. However, this is non-limiting. The starter generator 17 may be controlled to the powering state, with the switch SW1 kept in the ON state. Examples may include a motor assistance control in which the starter generator 17 provides assistance to the engine 12 at the time of the start and the acceleration. Power consumption of the starter generator 17 in the motor assistance control is smaller than power consumption of the starter generator 17 at the restart of the engine 12 as mentioned above. Accordingly, in the powering state of the starter generator 17, the switch SW1 may be kept in the ON state. Thus, in the motor assistance control that involves smaller power consumption, keeping the switch SW1 in the ON state hardly causes any large current flow from the lead battery 61 to the starter generator 17. Hence, it is possible to stabilize a power supply voltage of the group of the electric devices 74.

[Regenerative Power Generation Control]

Figure 9:
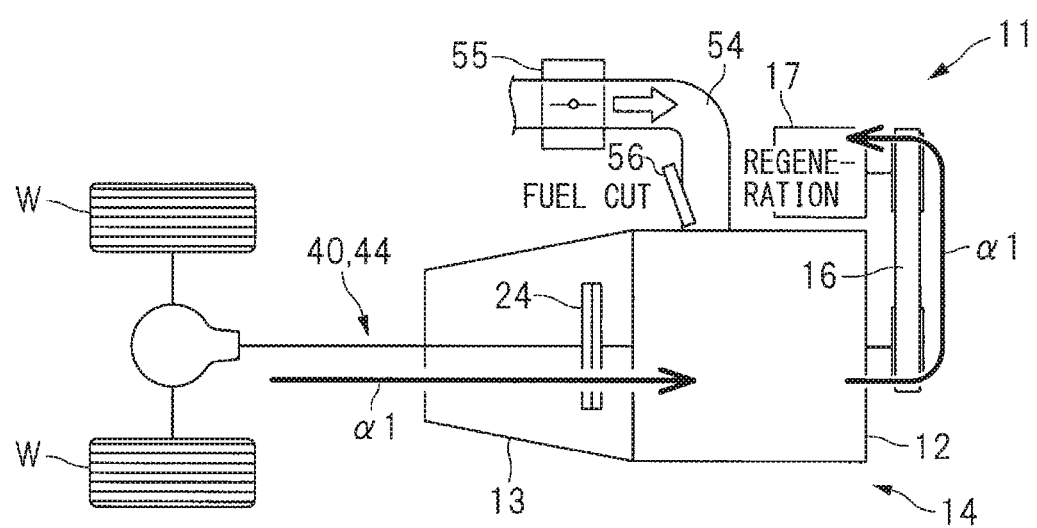
FIG. 9 is a schematic diagram of an example of an operation state of a power train in a regenerative power generation control.

Described next are details of a regenerative power generation control. As described, the starter generator 17 may be controlled to the regenerative power generation state on the decelerated travel of the vehicle 11. It is to be noted that in the following description, the front wheels 23 and the rear wheels 21 are collectively referred to as "wheels W". FIG. 9 schematically illustrates an operation state of the power train 14 in the regenerative power generation control. Referring to FIG. 9, on the decelerated travel with the release of the stepping down of the accelerator pedal, the engine 12 may be controlled to the fuel cut state. The starter generator 17 may be controlled to the regenerative power generation state. The lock up clutch 24 may be controlled to an engaged state. Thus, engaging the lock up clutch 24 on the decelerated travel makes it possible to efficiently transmit the motive power from the wheels W toward the starter generator 17, as denoted by an arrow $\alpha 1$. Hence, it is possible to enhance regenerative torque of the starter generator 17, i.e., the power generation torque of the starter generator 17, and to increase the power-generated electric power on the decelerated travel.

Moreover, on the decelerated travel where regenerative power generation is carried out, the throttle valve 55 may be controlled openwise, instead of being controlled to a fully closed state. The term "openwise" means a direction in which the throttle plate position becomes greater than a predetermined throttle plate position threshold. Thus, controlling the throttle valve 55 openwise makes it possible to increase the amount of the intake air of the engine 12, as denoted by a white void arrow, leading to reduction in a pumping loss of the engine 12. This makes it possible to reduce engine braking on the decelerated travel. Hence, it is possible to increase the power generation torque without an excessive increase in the deceleration rate of the vehicle 11, and to increase the power-generated electric power and recover much kinetic energy. It is to be noted that in controlling the throttle valve 55 openwise, the throttle plate position may be controlled so as to prevent shortage of negative pressure of, for example, an undepicted vacuum booster.

[Retardation Cancellation Control]

Description now moves on to a case where an accelerator pedal operation is made on the decelerated travel of the vehicle 11, i.e., a case where the accelerator pedal is stepped down on the decelerated travel. In this case, the engine 12 may be controlled from the fuel cut state to the fuel injection state because it is necessary to output engine torque and accelerate the vehicle 11. As mentioned above, the situation on the decelerated travel is that the throttle valve 55 may be controlled openwise and that the amount of the intake air of the engine 12 is increasing. The restart of the fuel injection, with the amount of the intake air increasing as mentioned above, may constitute a possible cause of an excessive output of the engine torque. Accordingly, from the viewpoint of reduction in the engine torque output, the ignition retardation control may be executed. The ignition retardation control may include delaying the ignition timing. In this way, it is possible to reduce the engine torque and to suppress a shock accompanying the restart of the fuel injection.

The situation that the accelerator pedal is stepped down on the decelerated travel is that a request for accelerated travel is made by a driver. It is therefore necessary to quickly advance the ignition timing and to return to a normal control after executing the ignition retardation control. However, rapidly changing the ignition timing may constitute a possible cause of torque fluctuation of the engine 12, contributing to occurrence of a shock. What is desired is, therefore, to quickly advance the ignition timing while suppressing the occurrence of the shock. Thus, the ignition tinning control unit 92 of the main controller 90 may execute a retardation cancellation control, in advancing the ignition timing after executing the ignition retardation control. The retardation cancellation control includes switching a change rate of the ignition timing on the basis of a rotational acceleration rate Sa of the secondary shaft 35.

(Timing Chart)

Figure 10:
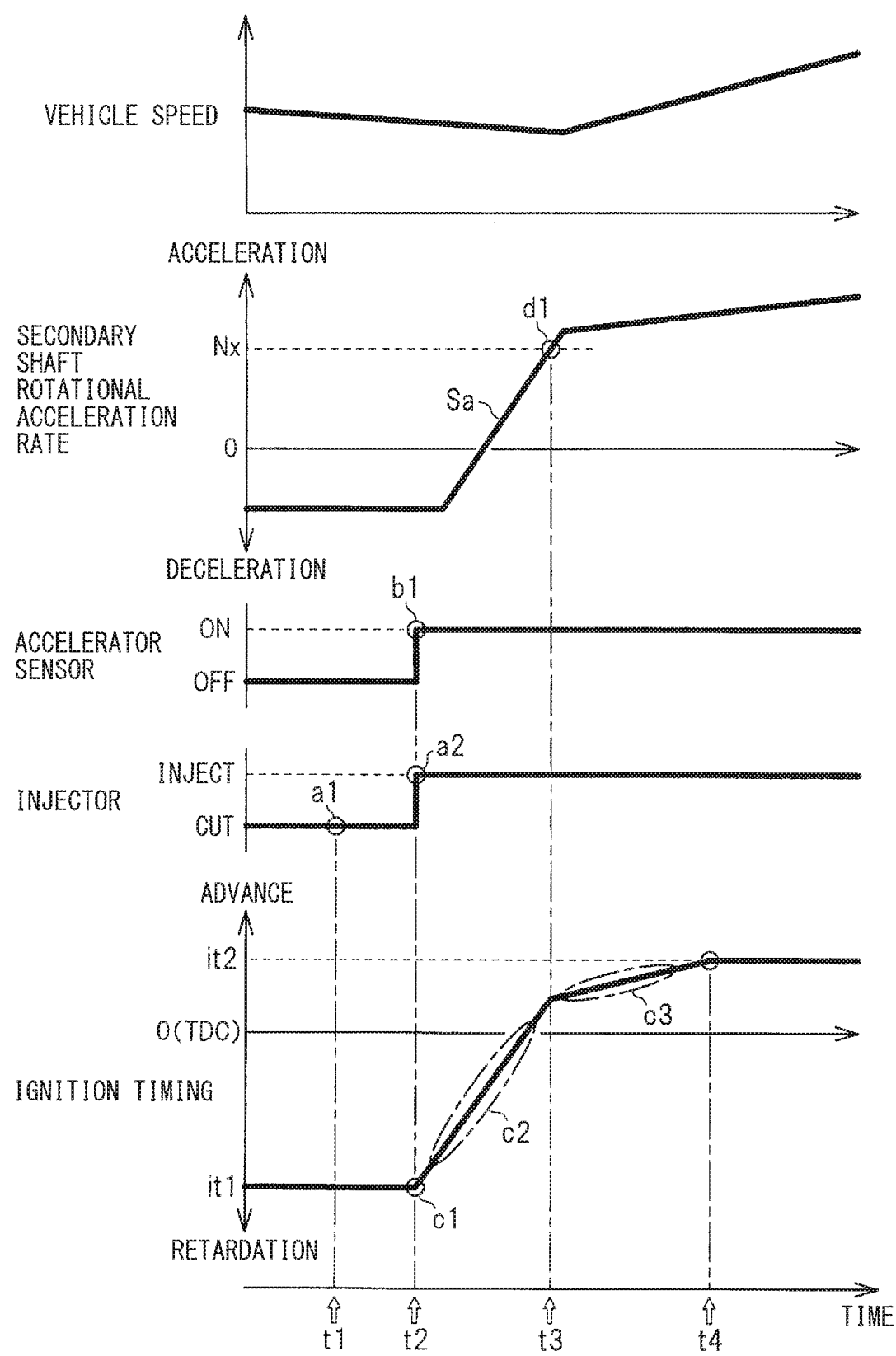
FIG. 10 is a timing chart of an example of transitions of ignition timing in a retardation cancellation control.

FIG. 10 is a timing chart of an example of transitions of the ignition timing in the retardation cancellation control. It is to be noted that the reference characters "Sa" in FIG. 10 denote the rotational acceleration rate of the secondary shaft 35. The rotational acceleration rate Sa may be an angular acceleration rate, and be calculated by the main controller 90 on the basis of a detection signal of the secondary rotation sensor 46. As illustrated in FIG. 10, a state in which the accelerator sensor 100 is "OFF" is that the accelerator pedal is not stepped down by the driver. A state in which the accelerator sensor 100 is "ON" is that the accelerator pedal is stepped down by the driver so that an amount of the stepping down of the accelerator pedal becomes greater than a predetermined amount.

In one implementation of the technology, the rotational acceleration rate Sa of the secondary shaft 35 may serve as a "rotational acceleration rate of the output-side rotating element".

As illustrated in FIG. 10, at timing t1, on the decelerated travel with the release of the stepping down of the accelerator pedal, the engine 12 may be controlled to the fuel cut state (reference characters a1). Thereafter, at timing t2, the accelerator pedal is stepped down on the decelerated travel (reference characters b1), and thereupon, the engine 12 may be switched to the fuel injection state (reference characters a2). At the restart of the fuel injection of the engine 12 in this way, the ignition retardation control may be executed (reference characters c1). The ignition retardation control may include controlling the ignition timing to first timing it1. The first timing it1 may be set on retardation side of a top dead center TDC at which a crank angle is zero degree (0°). Thus, controlling the ignition timing to the first timing it1 on the retardation side makes it possible to reduce the engine torque and to suppress the occurrence of the shock in accompaniment with the restart of the fuel injection.

As mentioned above, after executing the ignition retardation control, it is necessary to quickly advance the ignition timing and return to the normal control. However, rapidly changing the ignition timing of the engine 12 may cause the torque fluctuation of the engine 12, resulting in possibility of the occurrence of the shock. The ignition timing control unit 92 of the main controller 90 may, therefore, switch the change rate of the ignition timing on the basis of the rotational acceleration rate Sa of the secondary shaft 35. In other words, as illustrated in FIG. 10, in a section from timing t2 to timing t3, the ignition timing is advanced toward second timing it2 at a first change rate, as denoted by reference characters c2, until the rotational acceleration rate Sa of the secondary shaft 35 reaches a predetermined threshold Nx. In a section from timing t3 to timing t4, after the rotational acceleration rate Sa of the secondary shaft 35 reaches the predetermined threshold Nx, as denoted by reference characters c3, the ignition timing is advanced toward the second timing it2 at a second change rate smaller than the first change rate. In this way, in the retardation cancellation control, the rotational acceleration rate Sa of the secondary shaft 35 reaches the predetermined threshold Nx (reference characters d1), and thereupon, the change rate at which the ignition timing is advanced toward the second timing it2 is switched from the relatively greater first change rate to the relatively smaller second change rate. It is to be noted that as illustrated in FIG. 10, the second timing it2 may be set on advance side of the top dead center TDC at which the crank angle is zero degree (0°).

The situation until the rotational acceleration rate Sa of the secondary shaft 35 reaches the threshold. Nx is that a clearance, i.e., a backlash, of a power transmission system 110 is not clogged. In contrast, the situation after the rotational acceleration rate Sa of the secondary shaft 35 reaches the threshold Nx is that the backlash of the power transmission system 110 is clogged. Accordingly, until the rotational acceleration rate Sa of the secondary shaft 35 reaches the threshold Nx, i.e., until the backlash of the power transmission system 110 is clogged, the ignition timing is rapidly changed at the relatively greater first change rate because the torque fluctuation of the engine 12 is less likely to be transmitted to the wheels W. In contrast, after the rotational acceleration rate Sa of the secondary shaft 35 reaches the threshold Nx, after the backlash of the power transmission system 110 is clogged, the ignition timing is mildly changed at the relatively smaller second change rate because the torque fluctuation of the engine 12 is readily transmitted to the wheels W. Thus, switching the change rate of the ignition timing on the basis of the rotational acceleration rate Sa of the secondary shaft 35 makes it possible to quickly advance the ignition timing while suppressing the occurrence of the shock. It is to be noted that the power transmission system 110 refers to a power transmission path from the engine 12 to the wheels W. In other words, the power transmission system 110 includes the input-side power transmission path 36, the continuous shifting mechanism 27, and the output-side power transmission paths 40 and 44.

(Operation States of Power Train)

Description now moves on to operation states of the power train 14 in the retardation cancelation control. FIGS. 11A to 11C schematically illustrate examples of the operation states of the power train 14 in the retardation cancellation control. FIGS. 11A to 11C illustrate a gear train X that constitutes part of the power transmission system 110. FIG. 11A illustrates the situation at timing t1 illustrated in FIG. 10. FIG. 11B illustrates the situation from timing t2 to timing t3 illustrated in FIG. 10. FIG. 11C illustrates the situation from timing t3 to timing t4 illustrated in FIG. 10. It is to be noted that FIG. 11B illustrates the ignition timing denoted by reference characters c2 in FIG. 10, and FIG. 11C illustrates the ignition timing denoted by reference characters c3 in FIG. 10.

As illustrated in FIG. 11A, on the decelerated travel with the release of the stepping down of the accelerator pedal, the engine 12 may be controlled to the fuel cut state. This causes power transmission from the wheels W toward the engine 12, as denoted by the arrow α1. At this occasion, as to the gear train X that constitutes part of the power transmission system 110, tooth surfaces C1 and C2 on coasting side are engaged with each other, and the backlash of the power transmission system 110 is clogged on the coasting side.

Thereafter, as illustrated in FIG. 11B, the stepping down of the accelerator pedal causes the engine 12 to be controlled to the fuel injection state. This causes a start of engine torque transmission toward the wheels W, as denoted by an arrow β1. Immediately after the restart of the fuel injection causes an engine torque output as mentioned above, the gear train X is going through a phase of a shift from the engagement of the tooth surfaces C1 and C2 on the coasting side to engagement of tooth surfaces D1 and D2 on drive side, and the backlash of the power transmission system 110 is not clogged on the drive side. In the situation that the backlash of the power transmission system 110 is not clogged, the torque fluctuation of the engine 12 is less likely to be transmitted to the wheels W. Accordingly, as denoted by reference characters d2, the ignition timing is rapidly changed at the first change rate.

Thereafter, as illustrated in FIG. 11C, predetermined time elapses after the engine 12 is controlled to the fuel injection state, and thereupon, the engine torque is transmitted to the wheels W, as denoted by an arrow β2. In this way, upon the elapse of the predetermined time after the engine torque output, as to the gear train X, the tooth surfaces D1 and D2 on the drive side are engaged with each other, and the backlash of the power transmission system 110 is clogged on the drive side. In the situation that the backlash of the power transmission system 110 is clogged as mentioned above, the torque fluctuation of the engine 12 is readily transmitted to the wheels W. Accordingly, as denoted by reference characters d2, the ignition timing is mildly changed at the second change rate.

As described above, until the rotational acceleration rate Sa of the secondary shaft 35 reaches the threshold Nx, i.e., until the backlash of the power transmission system 110 is clogged, the ignition timing is rapidly changed at the first change rate because the torque fluctuation of the engine 12 is less likely to be transmitted to the wheels W. Meanwhile, after the rotational acceleration rate Sa of the secondary shaft 35 reaches the threshold Nx, i.e., after the backlash of the power transmission system 110 is clogged, the ignition timing is mildly changed at the second change rate because the torque fluctuation of the engine 12 is readily transmitted to the wheels W. Thus, switching the change rate of the ignition timing on the basis of the rotational acceleration rate Sa of the secondary shaft 35 makes it possible to quickly advance the ignition timing while suppressing the occurrence of the shock.

In the forgoing example implementations, on the decelerated travel of the vehicle, the starter generator 17 is controlled to the regenerative power generation state, i.e., the power generation state. However, this is non-limiting. For example, even on the decelerated travel on which the starter generator 17 is controlled to the power generation suspended state or the powering state, the ignition retardation control may be executed in the case where the accelerator pedal operation causes the engine 12 to be controlled to the fuel injection state, and thereafter, the retardation cancelation control as mentioned above may be executed. Moreover, in the forgoing example implementations, on the decelerated travel of the vehicle 11, the throttle valve 55 is controlled openwise, but this is non-limiting. For example, even on the decelerated travel on which the throttle valve 55 is controlled to the fully closed state, the ignition retardation control may be executed in the case where the accelerator pedal operation causes the engine 12 to be controlled to the fuel injection state, and thereafter, the retardation cancelation control as mentioned above may be executed.

As to the threshold Nx to be compared with the rotational acceleration rate Sa of the secondary shaft 35, it suffices to render it detectable that the rotational acceleration rate Sa of the secondary shaft 35 has made a transition from deceleration side to acceleration side. Accordingly, as illustrated in FIG. 10, the threshold Nx may be set at zero (0), or alternatively, the threshold Nx may be set at a greater value than zero. Moreover, the rotational acceleration rate Sa may be the angular acceleration rate [rad/s$^2$], but a replacement for the rotational acceleration rate Sa may be also used. Non-limiting examples of the replacement for the rotational acceleration rate Sa may include an acceleration rate [m/s$^2$] of the vehicle 11 in a forwarding direction. It is to be noted that in the case where the rotational acceleration rate Sa is replaced with the acceleration rate [m/s$^2$] of the vehicle 11, for example, 0.3 [m/s$^2$] may be used as the threshold Nx. Furthermore, in the forgoing example implementations, the rotational acceleration rate Sa of the secondary shaft 35 may serve as the "rotational acceleration rate of the output-side rotational element", but this is non-limiting. Rotational acceleration rates of other output-side rotational elements provided on the output-side power transmission paths 40 and 44 may also serve as the "rotational acceleration rate of the output-side rotational element". For example, a rotational acceleration rate of the front wheel drive shaft 22 or the rear wheel drive shaft 20 may serve as the "rotational acceleration rate of the output-side rotational element", or alternatively, a rotational acceleration rate of the front wheel output shaft 38 or the rear wheel output shaft 43 may serve as the "rotational acceleration rate of the output-side rotational element".

In the example illustrated in FIG. 10, the change rate of the ignition timing is two-step switched, but this is non-limiting. The change rate of the ignition timing may be three-or-more-step switched. In this case, the change rate of the ignition timing may be set smaller as the ignition timing comes closer to the second timing it2. Moreover, the first timing it1 and the second timing it2 that serve as control targets of the ignition timing may be variable values to be set in accordance with, for example, the amount of the intake air or the engine speed, or alternatively, the first timing it1 and the second timing it2 may be prescribed fixed values.

Although some preferred implementations of the technology are described above by way of example with reference to the accompanying drawings, the technology is by no means limited to the implementations described above. It should be appreciated that modifications and alterations may be made by persons skilled in the art without departing from the scope as defined by the appended claims. In the forgoing example implementations, the continuous shifting mechanism 27 may serve as the "shifting mechanism" of the technology. Alternatives may include an automatic transmission mechanism of a planetary gear type or a parallel axis type, and a manual transmission mechanism of a parallel axis type. Moreover, the vehicle 11 in the figures may be an all wheel drive vehicle that drives both the front wheels 23 and the rear wheels 21, but this is non-limiting. Alternatives may include a front wheel drive vehicle that drives the front wheels 23, and a rear wheel drive vehicle that drives the rear wheels 21.

In the forgoing example implementations, as the generator coupled to the engine 12, provide is the starter generator 17 that also serves as the electric motor. However, this is non-limiting. For example an alternator that does not serve as the electric motor may be also adopted as the generator coupled to the engine 12. Moreover, in the forgoing example implementations, the main controller 90 includes the fuel injection control unit 91, the ignition timing control unit 92, the ISG control unit 95, the throttle valve control unit 93, and other control units. However, this is non-limiting. The fuel injection control unit 91, the ignition timing control unit 92, the ISG control unit 95, and the throttle valve control unit 93, or other control units, or any combination thereof may be provided in other controllers, or alternatively the fuel injection control unit 91, the ignition timing control unit 92, the ISG control unit 95, and the throttle valve control unit 93, or other control units, or any combination thereof may be distributed over a plurality of controllers.

In the forgoing example implementations, two accumulators are coupled to the starter generator 17, but this is non-limiting. A single accumulator may be coupled to the starter generator 17. Moreover, in the forgoing example implementations, the lithium ion battery 62 and the lead battery 61 are adopted, but this is non-limiting. Other kinds of batteries or capacitors may be adopted. In addition, in the forgoing example implementations illustrated in FIGS. 1 and 3, the switch SW2 is provided on the positive electrode line 64 of the lithium ion battery 62, but this is non-limiting. For example, as denoted by an alternate long and short dashed line in FIG. 3, the switch SW2 may be provided on the negative electrode line 69 of the lithium ion battery 62.

The main controller 90, the fuel injection control unit 91, the ignition timing control unit 92, the throttle valve control unit 93, the shifting control unit 94, the ISG control unit 95, and the switch control unit 96 illustrated in FIGS. 1 and 4 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the main controller 90, the fuel injection control unit 91, the ignition timing control unit 92, the throttle valve control unit 93, the shifting control unit 94, the ISG control unit 95, and the switch control unit 96. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the main controller 90, the fuel injection control unit 91, the ignition timing control unit 92, the throttle valve control unit 93, the shifting control unit 94, the ISG control unit 95, and the switch control unit 96 illustrated in FIGS. 1 and 4.

It should be appreciated that modifications and alterations may be made by persons skilled in the art without departing from the scope as defined by the appended claims. The use of the terms first, second, etc. does not denote any order or importance, but rather the terms first, second, etc. are used to distinguish one element from another. The technology is intended to include such modifications and alterations in so far as they fall within the scope of the appended claims or the equivalents thereof.

The invention claimed is:

1. A vehicle control apparatus to be mounted on a vehicle, the vehicle including an engine, a shifting mechanism, one or more wheels, a first power transmission path between the engine and the shifting mechanism, and a second power transmission path between the shifting mechanism and the one or more wheels, the vehicle control apparatus comprising:
    an input-side rotating element provided on the first power transmission path;
    an output-side rotating element provided on the second power transmission path;
    a fuel injection controller configured to control the engine from a fuel cut state to a fuel injection state on a condition that an accelerator pedal operation is made on decelerated travel of the vehicle; and
    an ignition timing controller configured to control ignition timing of the engine to first timing on a condition that the engine is controlled from the fuel cut state to the fuel injection state, and afterwards, change the ignition timing to second timing on advance side of the first timing,
    the ignition timing controller changing the ignition timing toward the second timing at a first change rate until a rotational acceleration rate of the output-side rotating element reaches a threshold, and
    the ignition timing controller changing the ignition timing toward the second timing at a second change rate smaller than the first change rate, after the rotational acceleration rate of the output-side rotating element reaches the threshold.

2. The vehicle control apparatus according to claim 1, wherein the threshold is set at zero.

3. The vehicle control apparatus according to claim 2, wherein the first timing is set on retardation side of a top dead center.

4. The vehicle control apparatus according to claim 2, wherein the second timing is set on the advance side of a top dead center.

5. The vehicle control apparatus according to claim 2, further comprising:
    a generator coupled to the engine;

a throttle valve provided in an intake system of the engine;
a power generation controller configured to control the generator to a power generation state on the decelerated travel of the vehicle; and
a throttle valve controller configured to control the throttle valve openwise on the decelerated travel of the vehicle.

6. The vehicle control apparatus according to claim 1, wherein the threshold is set at a value that renders it detectable that the rotational acceleration rate of the output-side rotating element has made a transition from deceleration side to acceleration side.

7. The vehicle control apparatus according to claim 6, wherein the first timing is set on retardation side of a top dead center.

8. The vehicle control apparatus according to claim 6, wherein the second timing is set on the advance side of a top dead center.

9. The vehicle control apparatus according to claim 6, further comprising:
a generator coupled to the engine;
a throttle valve provided in an intake system of the engine;
a power generation controller configured to control the generator to a power generation state on the decelerated travel of the vehicle; and
a throttle valve controller configured to control the throttle valve openwise on the decelerated travel of the vehicle.

10. The vehicle control apparatus according to claim 1, wherein the first timing is set on retardation side of a top dead center.

11. The vehicle control apparatus according to claim 10, wherein the second timing is set on the advance side of a top dead center.

12. The vehicle control apparatus according to claim 10, further comprising:
a generator coupled to the engine;
a throttle valve provided in an intake system of the engine;
a power generation controller configured to control the generator to a power generation state on the decelerated travel of the vehicle; and
a throttle valve controller configured to control the throttle valve openwise on the decelerated travel of the vehicle.

13. The vehicle control apparatus according to claim 1, wherein the second timing is set on the advance side of a top dead center.

14. The vehicle control apparatus according to claim 1, further comprising:
a generator coupled to the engine;
a throttle valve provided in an intake system of the engine;
a power generation controller configured to control the generator to a power generation state on the decelerated travel of the vehicle; and
a throttle valve controller configured to control the throttle valve openwise on the decelerated travel of the vehicle.

15. A vehicle control apparatus to be mounted on a vehicle, the vehicle including an engine, a shifting mechanism, one or more wheels, a first power transmission path between the engine and the shifting mechanism, and a second power transmission path between the shifting mechanism and the one or more wheels, the vehicle control apparatus comprising:
an input-side rotating element provided on the first power transmission path;
an output-side rotating element provided on the second power transmission path; and
circuitry configured to
control the engine from a fuel cut state to a fuel injection state on a condition that an accelerator pedal operation is made on decelerated travel of the vehicle, and
control ignition timing of the engine to first timing on a condition that the engine is controlled from the fuel cut state to the fuel injection state, and afterwards, change the ignition timing to second timing on advance side of the first timing,
wherein the circuitry changes the ignition timing toward the second timing at a first change rate until a rotational acceleration rate of the output-side rotating element reaches a threshold, and
wherein the circuitry changes the ignition timing toward the second timing at a second change rate smaller than the first change rate, after the rotational acceleration rate of the output-side rotating element reaches the threshold.

\* \* \* \* \*